May 26, 1942.          R. T. CORNELIUS          2,284,135
                    BEER DISPENSING SYSTEM
                    Filed Aug. 25, 1939          2 Sheets-Sheet 2

Inventor
Richard T. Cornelius
By Cansell & Lagaard
Attorneys

Patented May 26, 1942

2,284,135

UNITED STATES PATENT OFFICE 2,284,135

BEER DISPENSING SYSTEM

Richard T. Cornelius, Minneapolis, Minn.

Application August 25, 1939, Serial No. 291,903

6 Claims. (Cl. 285—40)

My invention relates to beer dispensing systems and particularly to systems whereby beer may be directly dispensed from the keg through a tap tube applied thereto.

An object of the invention resides in providing a construction by means of which the pressure of the beer passing through the tap tube is sufficiently reduced to permit of dispensing the beer without undue foaming.

Another object of the invention resides in providing a construction in which the faucet for dispensing the beer is directly attached to the tap tube and supported thereby.

A still further object of the invention resides in providing a construction in which a minimum amount of beer is maintained in the portion of the system disposed outwardly of the barrel to reduce the amount of warm beer and beer adapted to foam excessively first drawn after a period of disuse of the system.

Another object of the invention resides in providing a system in which a minimum amount of heat transfer to the beer in its passage to the faucet occurs.

An object of the invention resides in providing constricting means forming a constriction in the passageway of the tap tube, said constricting means being disposed within the confines of the barrel.

Another object of the invention resides in providing the constricting means at the lowermost end of the tap tube and near the inlet to the same.

A feature of the invention resides in providing a cap for the end of the tap tube and in providing a core carried thereby and forming the constriction.

Another object of the invention resides in providing a strainer disposed within the tap tube and carried by the cap.

A still further object of the invention resides in utilizing said strainer as a support for the core forming the constriction in the tap tube passageway.

A feature of the invention resides in constructing said cap, strainer and core removable as a unit for facilitating cleaning of the tap tube and associated structures.

An object of the invention resides in disposing within the tap tube and above the constricting means a tube of smaller diameter and extending up to the faucet to reduce the volume of beer contained within the system exteriorly of the barrel and to form a dead air space about said tube for resisting the transfer of heat to the beer within the inner tube.

A still further object of the invention resides in applying to the exposed portion of the tap tube a jacket containing an insulating material for further reducing the transfer of heat to the beer within the inner tube.

Other objects of the invention reside in the novel combination and arrangement of parts and in the details of construction hereinafter illustrated and/or described.

In the dispensing of beer, the pressure of the beer at the barrel is usually reduced prior to the entry of the beer in the faucet. This avoids excessive foaming of the beer when drawn and permits of drawing clear or partly clear beer, as desired. I have found that, where the beer is relatively warm when the pressure is reduced, excess foaming occurs, even with reduction in pressure. Thus, where beer has not been drawn from a faucet for an appreciable length of time and the means for reducing the pressure of beer is situated close to the faucet the beer first drawn will be warm and will foam excessively. The present invention overcomes this difficulty by placing the pressure reducing means within the barrel so that the beer passing through the same is at all times relatively cold.

Figure 1:
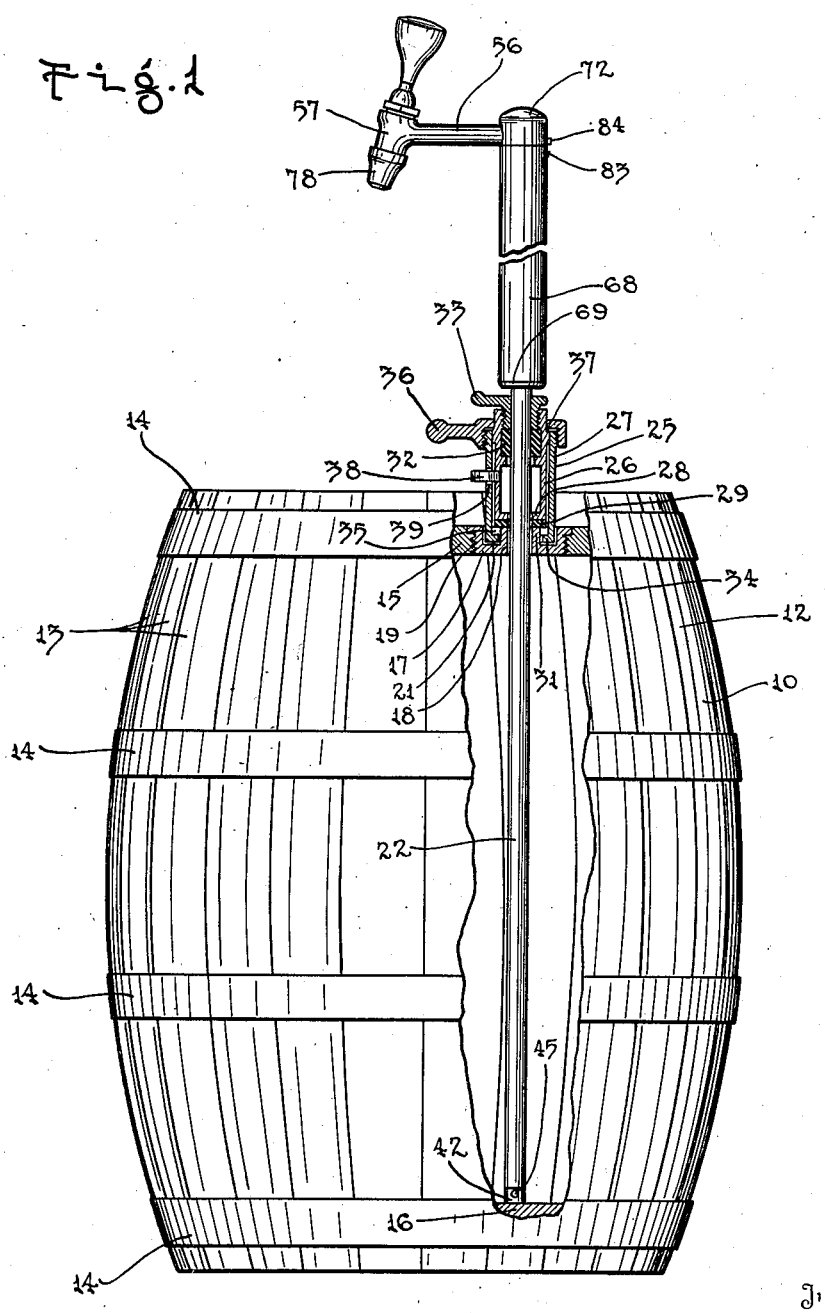
Fig. 1 is an elevational view of a beer barrel having portions thereof cut away, together with a tap tube and faucet connected thereto and illustrating an embodiment of my invention.
Figure 2:
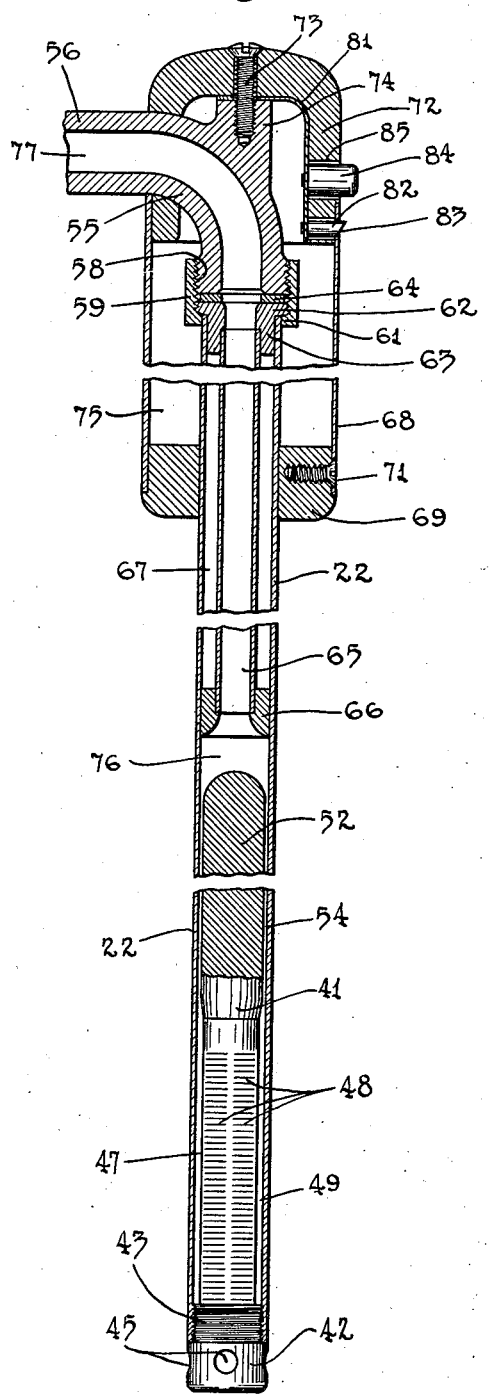
Fig. 2 is an elevational longitudinal sectional view of a tap tube and a portion of the structure associated therewith.
Figure 3:
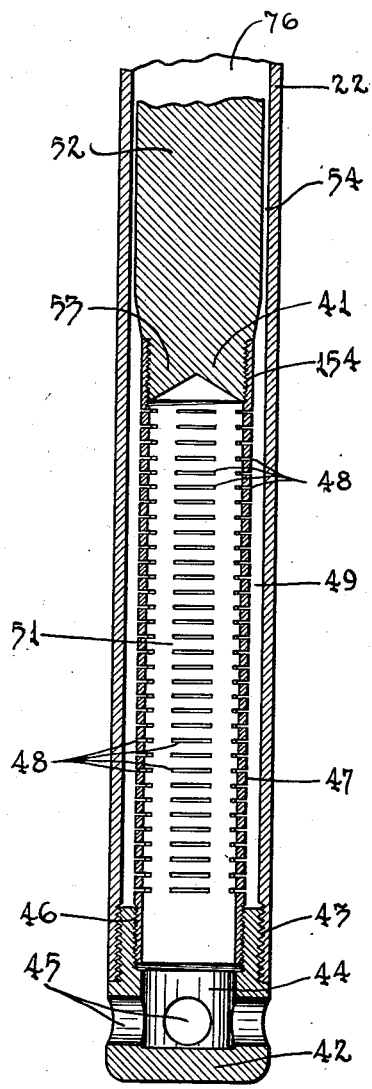
Fig. 3 is a view similar to Fig. 2 of a portion of the structure shown therein and drawn to a greater scale.

For the purpose of illustrating my invention an ordinary beer barrel has been shown in Fig. 1, which is indicated by the numeral 10. The construction of such beer barrels forming no particular feature of the invention has not been illustrated in detail in the drawing. The beer barrel shown comprises a body 12 constructed with staves 13 held together in the usual manner by means of metal hoops 14. The upper end of the barrel is provided with a head 15 and the lower end of the barrel with a bottom 16 which are held in place by the staves 13 in the customary manner. Access to the barrel is had through a bung 17 which is constructed with the usual bung hole 18. This bung has threads 19 which screw into the head 15 and hold the bung securely attached to the same. In the bung 17 is formed a socket 21 which receives a suitable fixture 25 for attaching a tap tube to the barrel.

The invention utilizes a tap tube 22 which is of such dimensions as to be freely received in the bung hole 18 of the bung 17 and to be extended to the bottom 16 of barrel 10. This tube is of such a length that the same projects considerably above the head 15 of the barrel for a purpose which will become presently apparent.

The fixture 25 for attaching the tap tube 22 to the barrel 10 comprises an inner tubular member 26 and an outer tubular member 27. The inner tubular member 26 is constructed at its lower end with an inwardly extending flange 28. A gasket 29 is disposed between this flange and a collar 31 formed on the bung 17 and forms a fluid tight connection therebetween. The upper end of this tubular member is recessed to receive a gasket 32 which is urged into engagement with the walls of said member and the tap tube 22 by means of a nut 33 to form a fluid tight connection between the same. Nut 33 is screwed into the tubular member 26. The tubular member 27 is provided with inwardly extending lugs 34 which engage complemental lugs 35 on the collar 31. By rotating the tubular member 27 these lugs are brought into engagement and the member 27 held attached to the bung 17. A nut 36 screwed upon the exterior of the tubular member 27 and engaging a shoulder 37 on the tubular member 26 draws said member 26 downwardly, causing the flange 28 to seat upon the gasket 29 and correspondingly draws the tubular member 27 upwardly causing a firm engagement of the lugs 34 and 35. A nipple 38 passes freely through an opening 39 in the member 27 and is threaded into the member 26. This nipple may be connected to a source of air under pressure, or to an air pump whereby air under pressure may be directed into the uppermost portion of the barrel to cause the discharge of beer from the same.

At the lowermost end of the tap tube 22 is provided a flow regulating device 41. This device includes a cap 42 which is externally threaded to screw into threads 43 formed upon the interior of the lowermost end of the tap tube 22. The cap 42 is constructed with a bore 44 and exteriorly of the tap tube 22 is formed with transverse openings 45 which communicate with the bore 44.

The bore 44 of the cap 42 is threaded, as designated at 46, to receive the threaded end of a tubular strainer 47 having a bore 51 therethrough. Strainer 47 is constructed about its periphery with numerous slits 48 which form perforations permitting the beer to pass from the bore 51 through the strainer and holding back foreign material within the bore 51 of the tube. The tube 47 is spaced from the wall of the tap tube 22 to leave an annular space 49 therebetween into which the beer, discharged from the strainer, passes. The bore 51 of strainer 47 communicates with the bore 44 of cap 42.

Within the interior of the tap tube 22 is provided a cylindrical core 52. This core is constructed with a threaded neck 53 which screws into internal threads 54 formed in the upper end of the strainer 47. The external diameter of the core 52 is slightly less than the internal diameter of the tap tube 22 to provide an annular constriction 54 in the passageway within said tap tube. The beer, on leaving the annular space 49 surrounding the strainer 47 enters the constriction 54 and the pressure thereof is reduced when the beer leaves the end of the said constriction.

At the uppermost end of the tap tube 22 is provided an elbow 55. This elbow has issuing from it a short tubular portion 56 which has formed at the end thereof a faucet 57. The faucet 57 forming no particular feature of the invention has not been shown in detail and the construction thereof has not been illustrated and will not be described. The elbow 55 is threaded at its lower end as designated at 58 to receive a clamp nut 59 which is formed with a flange 61 adapted to engage a collar 62, formed on a fitting 63, received within the upper end of the tap tube 22. The fitting 63 is preferably soldered or brazed into the end of the tube 22. A gasket 64, disposed between the elbow 55 and the fitting 63, forms a fluid tight connection between the tap tube and said elbow.

Within the interior of the uppermost portion of the tap tube 22 is an inner tube 65 of somewhat smaller dimensions than the tap tube 22, which tube is soldered at its upper end to the fitting 63. A sleeve 66 received within the tap tube 22 encircles the lower end of the tube 65 and holds said inner tube spaced from the tap tube 22 to provide a dead air space 67 surrounding the same. The sleeve 66 is soldered to both the tap tube 22 and the inner tube 65 so that passage of beer into this space is absolutely prevented. This space serves to insulate the tap tube for a portion of the length of the same and reduces the heat absorbed by the beer flowing through the same. For the purpose of further insulating the beer passing through the tube 65 a tubular jacket 68 is employed which encircles the tap tube 22. A collar 69, mounted on the tap tube 22, receives the jacket 68 which is held attached thereto by means of screws 71. The upper end of the jacket 68 slips over a cap 72 which covers a portion of the elbow 55. This cap is held in position by means of a screw 73 which is screwed into a threaded boss 74, formed on elbow 55. The jacket 68 is detachably mounted on the cap 72 by means of the following construction. Secured between the said cap and the boss 74 is a leaf spring 81 which follows along the inner walls of the said cap. This leaf spring has attached to it a catch 82 which is adapted to engage into a notch 83, formed in the uppermost portion of the jacket 68. When the jacket is slid upwardly, catch 82 is forced into engagement with the notch 83 and holds the jacket in position. For disengaging the catch 82, a button 84 is employed which operates through a hole 85 in the cap 72 and which is also secured to the leaf spring 81. By means of this construction the jacket 68 may be removed to give access to the coupling between the elbow 55 and the tap tube 22. The jacket 68 is spaced from the tap tube 22 to provide another dead air space 75 therebetween which further serves to reduce absorption by the beer passing through the inner tube 65.

The operation of the invention is as follows: The tap tube 22 is inserted into the bung 17 of the barrel in the customary manner until the cap 42 thereof reaches the bottom 16. Nuts 33 and 36 are then screwed down to clamp the parts in proper position to prevent leakage of beer. When the faucet 57 is opened, beer enters the openings 45 of cap 42 and passes into the bore 44 of said cap and into the passageway formed by the bore 51 of strainer 47. The beer on entering this passageway passes through the slots 48 and into the space 49 from which the beer flows through the constriction 54 and into the portion 76 of the tap tube 22 immediately above the core 52. The beer then passes upwardly through the tube 65 and into the passageway 77 in elbow 55 and finally out through the faucet 57, being discharged therefrom through the spout 78 of said faucet. It will thus be seen that the beer first passing through the constriction 54 is relatively cold so that excessive foaming is prevented. The beer passing through the tube 65 is insulated through the dead air spaces 67 and 75 so that very little absorption of heat by the beer occurs in its passage to the faucet. At the same time the passageway 77 and tube 65 are made relatively small so that a small amount of beer is stored in the same. When it becomes desirable to clean the strainer and the interior of the tap tube, cap 42 together with strainer 47 and core 52 as a unit is removed by unscrewing the same at the threads 43. Thereafter the core 52 and strainer 47 may be detached from one another and from the cap 42 permitting thorough cleaning and inspection.

The advantages of my invention are manifest. By arranging the pressure reducing means within the barrel, highly advantageous results are procured. By arranging the inner tube for the passage of the beer in spaced relation with respect to the tap tube, a dead air space is formed which assists in reducing heat absorption by the beer. The use of the jacket encircling the tap tube and forming a second dead air space about the inner tube also assists in reducing heat absorption by the beer so that when the system has been standing for an appreciable length of time, little or no beer need be wasted. With my improved system no space is required at the faucet for the flow control device and a minimum amount of metal in the mechanism is thus utilized at such locality capable of transferring heat to the beer. My invention may be constructed at an extremely economical cost, since the tap tube itself is used as a housing for the flow control device. My improved beer dispensing system is particularly usable in conjunction with the so-called tap systems in which the beer is directly drawn from the barrel through a faucet permanently attached to the tap tube. The invention is extremely simple and will not get out of order and the parts thereof may be readily inspected and cleaned.

Changes in the specific form of my invention, as herein disclosed, may be made within the scope of what is claimed without departing from the spirit of my invention.

Having described my invention, what I claim as new and desire to protect by Letters Patent is:

1. A tap tube for insertion in a beer barrel, said tap tube having a passageway therethrough, a cap secured to the lower end of the tap tube and having a bore therein and openings communicating with said bore and forming an inlet to the tap tube, a tubular support carried by said cap and having a bore communicating with the bore of said cap, said support being spaced from the wall of said tap tube to provide an annular space constituting a portion of said passageway, said support having openings therein for bringing the bore of said support into communication with said annular space, and a core carried by said support and spaced from the wall of said tap tube to form a constriction therein for reducing the pressure of the beer passing through said passageway, said space being in communication with said first named annular space.

2. A tap tube for insertion in a beer barrel, said tap tube having a passageway therethrough, a cap secured to the lower end of the tap tube and provided with an inlet, a strainer disposed within said passageway and carried by said cap and a core carried by said strainer and disposed within said passageway, said core forming a constriction in the passageway for reducing the pressure of the beer passing through said passageway, said strainer being disposed between said inlet and constriction.

3. A tap tube for insertion in a beer barrel, said tap tube having a passageway therethrough, a cap secured to the lower end of the tap tube and provided with an inlet, a tubular strainer carried by said cap and spaced from the wall of said tap tube to form an annular space therebetween constituting a portion of said passageway, the interior of said strainer being in communication with said inlet, and a core carried by said strainer and spaced from the wall of said tap tube to form a constriction in said passageway for reducing the pressure of the beer passing through the passageway.

4. A tap tube for insertion in a beer barrel, said tap tube having a passageway therethrough, a cap secured to the lower end of the tap tube and provided with an inlet, a tubular strainer screwed into said cap, said strainer being spaced from the wall of said tap tube to form an annular space therebetween constituting a portion of said passageway, the interior of said strainer being in communication with said inlet and a core screwed to the end of said strainer and spaced from the wall of said tap tube to form a constriction in said passageway for reducing the pressure of the beer passing through the passageway, said cap, strainer and core being removable as a unit from said tap tube to expose the interior of the tap tube.

5. A tap tube for insertion in a beer barrel, said tap tube having a passageway therethrough, the lowermost end of said tap tube being internally threaded, a cap having a sleeve formed with a bore and threaded to screw into the threads of said tap tube, the bore of said cap being internally threaded, a tubular strainer of smaller diameter than the interior diameter of said tap tube and externally threaded to screw into the internal threads of said sleeve, said strainer having a plurality of openings therein, a core spaced from the wall of said tap tube and forming in conjunction therewith a constriction, said core having a neck thereon externally threaded to screw into the threads of said strainer, said core, strainer and cap being removable from the tap tube as a unit upon unscrewing of the first named threads.

6. A tap tube for insertion in a beer barrel, said tap tube having a bore therein, a tubular support within the bore of said tap tube spaced from the wall of the tap tube to form an annular passageway therebetween and closed at its upper end, said support having openings therein, a core carried by said support and spaced from the wall of said tap tube to form an annular constricted passageway therein, said constricted passageway being in communication with said first named passageway, and means forming an inlet to the tap tube disposed at the inner end thereof and communicating with the interior of the tubular support.

RICHARD T. CORNELIUS.